United States Patent
Sevenich et al.

(10) Patent No.: US 10,228,920 B2
(45) Date of Patent: Mar. 12, 2019

(54) AUTOMATIC SELECTION OF AN ABSTRACT DATA TYPE

(71) Applicant: Oracle International Corporation, Redwood Shores, CA (US)

(72) Inventors: Martin Sevenich, Palo Alto, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 947 days.

(21) Appl. No.: 14/276,895

(22) Filed: May 13, 2014

(65) Prior Publication Data

US 2015/0331683 A1 Nov. 19, 2015

(51) Int. Cl.
G06F 9/44 (2018.01)
G06F 8/41 (2018.01)

(52) U.S. Cl.
CPC .............. *G06F 8/443* (2013.01); *G06F 8/437* (2013.01)

(58) Field of Classification Search
None
See application file for complete search history.

(56) References Cited

U.S. PATENT DOCUMENTS

| | | | | |
|---|---|---|---|---|
| 7,152,223 B1* | 12/2006 | Brumme | ................... | G06F 8/41 717/116 |
| 7,757,225 B2* | 7/2010 | Copeland | ................ | G06F 8/443 707/705 |
| 2003/0131347 A1* | 7/2003 | Allison | ................... | G06F 9/443 717/165 |
| 2006/0167900 A1 | 7/2006 | Pingle et al. | | |
| 2008/0115107 A1* | 5/2008 | Arguelles | .............. | G06F 9/5027 717/124 |
| 2010/0125836 A1* | 5/2010 | Sazegari | ............... | G06F 8/4443 717/151 |
| 2010/0180269 A1* | 7/2010 | Stall | ........................ | G06F 8/437 717/151 |
| 2011/0154289 A1* | 6/2011 | Mannarswamy | ..... | G06F 8/4442 717/106 |
| 2013/0042258 A1* | 2/2013 | Rector | ...................... | G06F 8/51 719/328 |

FOREIGN PATENT DOCUMENTS

| | | |
|---|---|---|
| CN | 101159743 A | 4/2008 |
| JP | H03131934 A | 6/1991 |
| WO | WO 01/008007 A9 | 7/2002 |

OTHER PUBLICATIONS

Data structures, UNf.edu, Nov. 2011.*

(Continued)

*Primary Examiner* — Insun Kang
(74) *Attorney, Agent, or Firm* — Hickman Palermo Becker Bingham LLP

(57) ABSTRACT

An implementation of an abstract data type is automatically selected by a compiler of high-level language source code. The compiler chooses an implementation for each instance of an abstract data type in a program based on operations performed in the instance within the program. The compiler rewrites and compiles the high-level language source code in response to selecting the implementation.

18 Claims, 5 Drawing Sheets

(56) References Cited

OTHER PUBLICATIONS

Sedgewick et al., Priority Queues, pp. 1-15, copyright 2002-2014.*
Priority Queues and Binary Heap, pp. 1-10, 2011.*
Hinze, "Simple Implementation Technique for Priority Search Queues," 2001.*
Lammich, "Automatic Data Refinement," 2013.*
Guiho, "Automatic Programming Using Abstract Data Types," 1983.*
Leeman et al., "Automated Dynamic Memory Data Type Implementation Exploration and Optimization," © 2003 IEEE.*
Tang et al., "Assessment of the Effect of Memory Page Retirement on System RAS Against Hardware Faults", International Conference on Dependable Systems and Networks, dated Jun. 2006, 6 pages.
Srivas, Mandayam, K., "Automatic Synthesis of Implementations for Abstract Data Types for Algebraic Specifications", dated Jun. 1982, 165 pages.
Low, James, "Automatic Data Structure Selection: An Example and Overview", dated Sep. 1976, 27 pages.
Intel, "Intel Xeon Processor E7 Family: Reliability, Availability, and Serviceability", Advanced data integrity and resiliency support for mission-critical deployments, dated 2011, 16 pages.
IBM Corporation, "Choosing Efficient Data Types", dated 2004, 2 pages.
HP, "Avoiding Server Downtime from Hardware Errors in System Memory with HP Memory Quarantine", Technology brief, dated Jan. 2012, 7 pages.
Atmel, "EDAC Testing Injection of Correctable and Uncorrectable Errors", Dated 2003, 8 pages.

\* cited by examiner

Abstract Data Type MAP 205

| Operation Name | Operation Semantic |
|---|---|
| Set(key, value) | Sets value of the specified key. |
| Get(key) | Get the value of the given key. |
| Remove(key) | Remove the identified by the specified key. |
| GetMinValuedKey() | Get the key having the minimum value. |
| GetMaxValuedKey() | Get the key having the maximum value. |

Abstract Data Type LIST 210

| Operation Name | Operation Semantic |
|---|---|
| PushBack(Item) | Insert item at the end of list. |
| PushFront(Item) | Insert item at the beginning of list. |
| PopBack() | Remove item at the end of list and return the item. |
| PopFront() | Remove item at the beginning of list and return it. |
| Back() | Return the item at the end of the list |
| Front() | Return the item at the beginning of the list |

FIG. 2

AUTOMATIC SELECTION OF AN ABSTRACT DATA TYPE

CROSS-REFERENCE TO RELATED APPLICATIONS

Field of the Invention

The present invention relates to computer compilers, and in particular, optimizing compilation of abstract data types.

BACKGROUND

An abstract data type is a data type defined in effect by semantics of operations performed on the data type. In a program, abstract data types may only be accessed by these operations. Implementations of abstract data types and the operations that define the abstract data types are provided separately and may not be exposed to a programmer. There can be many different implementations for an abstract data type; however, the different implementations each support and honor the semantics of the operations.

The choice of implementation for abstract data types can greatly affect the performance of a program. Poor choice of implementation often leads to poor performance of the program. There may be no one-size-fits-all implementation of an abstract data type which performs best for every use case.

Typically, programmers choose the best implementation of the abstract data types for programs. Programmers may choose an existing implementation from an available library or program their own implementation.

Described herein are techniques for providing implementations for abstract data types.

BRIEF DESCRIPTION OF THE DRAWINGS

In the drawings:

FIG. 2 depicts a table listing operations that define, at least in part, an abstract data type according to an embodiment of the present invention.

DETAILED DESCRIPTION

In the following description, for the purpose of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Described herein are approaches for automatically selecting an implementation of an abstract data type. In the approaches, a compiler chooses an implementation for each instance of an abstract data type in a program based on operations performed on the instance within the program. The approaches for selecting an implementation in this way are referred to herein as automated ADT implementation.

Automated ADT implementation is preferably used for programs written in a computer language that prescribes "built-in" abstract data types. A built-in abstract data type is prescribed by a computer language specification by prescribing a set of operations that may be performed on an instance of an abstract data type, and by prescribing the semantics of each operation in the set. Based on knowledge of the semantics, developers of a compiler for the computer language program the compiler to select an abstract data type implementation optimized for the pattern of operations performed on an instance of the abstract data type.

Illustrative Compiler

Figure 1:
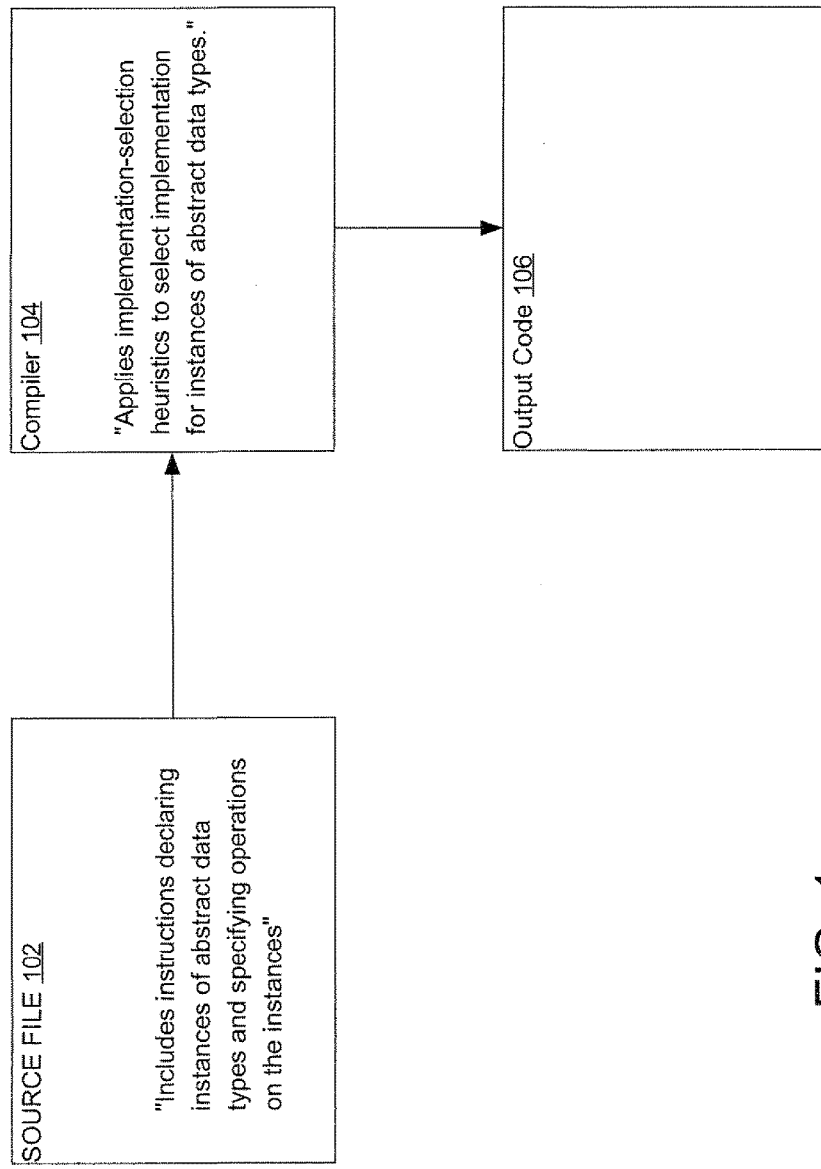
FIG. 1 is a diagram depicting an environment for a compiler according to an embodiment of the present invention.

FIG. 1 depicts an environment for a compiler configured for automated ADT implementation. Referring to FIG. 1, source code 102 represents computer readable instructions that are prepared in compliance with a given specification of a computer language specification. The source code may be human generated or machine generated. Source code 102 is received by a compiler 104, which compiles the source code 102 by translating the source code into output code 106 (e.g., object code and/or executable code, such as byte code or machine code). In an embodiment of the present invention, compiler 104 may be incorporated into a runtime environment, as for example, a Just-In-Time (JIT) compiler.

In an embodiment, source code 102 may first be translated into an intermediate language before being received by compiler 104. It should be understood that approaches for automated ADT implementation are illustrated using source code as input to compiler 104, however, embodiments of the present invention are not limited to compilers that compile only source code.

Generally, a compiler is a program that when executed by a computer process, translates source code (or intermediate language code) into object code or executable code. In some implementations, a second stage includes a linker that links the compiled object code with other object code to produce an executable program. After compilation, the object code or executable code is stored in a memory for subsequent compilation, execution, and packaging as a product or part thereof.

A program, such as a compiler, is described herein as performing certain acts and operations. Those skilled in the art recognize that describing a program in this way is a convenient way of expressing that a computer process executing the program performs the certain acts and operations.

Approaches for automated ADT implementation are preferably used for computer languages that prescribe built-in abstract data types. An example of such a computer language includes Green-Marl. Green-Marl includes abstract data types such as MAP and LIST.

Figure 3:
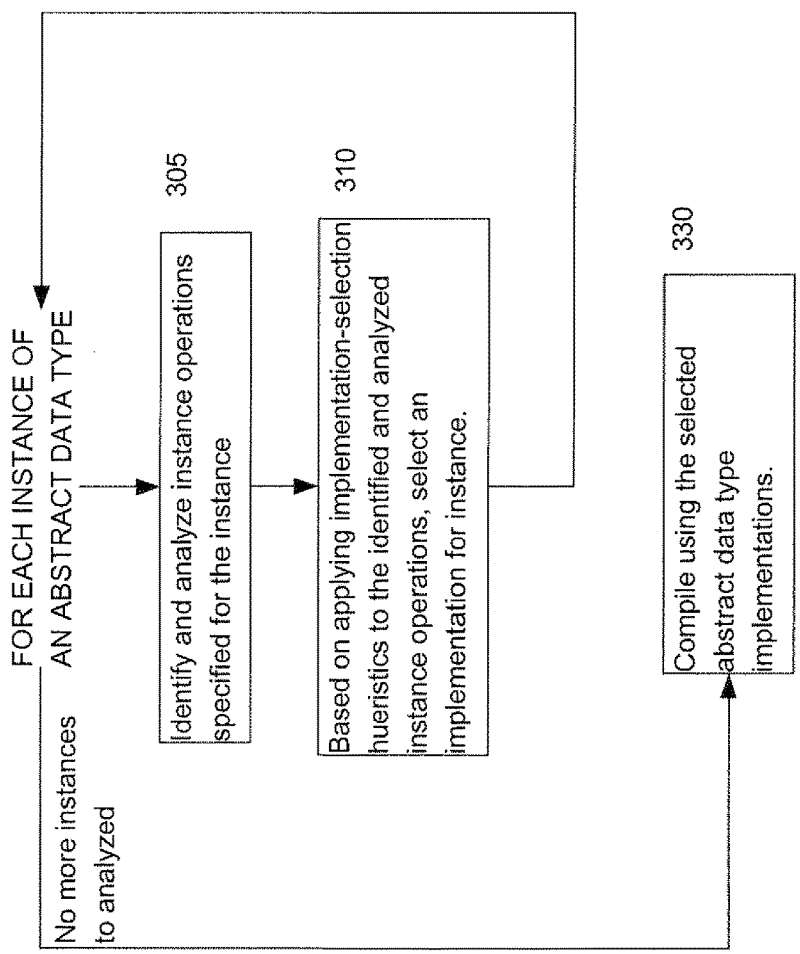
FIG. 3 is a flowchart showing a procedure for automatically selecting an implementation for abstract data types according to an embodiment of the present invention.

The abstract data type MAP provides storage for values and an identifying key for each value which may be used to access the value in the storage. Referring to FIG. 3, abstract data type MAP is defined by operations shown in table 205.

Each row in table 205 describes an operation. For each row, the first column contains the name of an operation; the second column specifies the semantic of the operation, including arguments of the operation, the result of the operation, and any argument returned for the operation, if any. The name may include an argument that is an input for the operation. For example, the first row in table 205 is for the operation Set (key, value), which has input arguments key and value, and which sets a value identified by key to the value specified by value. Get(key), has input argument key, and returns the value identified by key.

The names of the operation or the abstract data type are illustrative and not limiting. Other computer languages may use a different name for the same operation, where operations are the same between different computer languages when the operations have the same or substantially the same semantic.

The abstract data type LIST provides storage for a list of items, subject to the following restrictions. Items may only be added to the beginning or end of the list, may only be removed from the beginning or end of the list, and may only be returned (or read) from the beginning or end of the list. The abstract data type LIST supports the following operations as shown in table 210.

An abstract data type may be an archetype for variants of an abstract data type which are defined generally by the same set of operations or the same type of operations, but which have one or more specific features or properties. For example, NODELIST is a variant of LIST. NODELIST provides storage for a list of nodes.

Automated ADT Implementation

FIG. 3 depicts a procedure that a compiler may follow to perform automated ADT implementation. The procedure is first described and is then illustrated using the abstract data types introduced above and source code examples provided hereafter.

Referring to FIG. 3, for each instance of an abstract data type in a body of source code, at 305, compiler 104 identifies operations specified by the source code to perform on the instance.

At 310, implementation-selection heuristics are applied to select an implementation for the instance. Application of the implementation-selection heuristics is based, at least in part, on the identified operations. In general, implementation-selection heuristics comprise criteria, conditions, logic, and/or algorithms used for determining whether or not to use an implementation for a particular abstract data type. Importantly, the criteria, conditions, logic, and/or algorithms are based, at least in part, on the identified operations. To apply implementation-selection heuristics, a compiler is programmed to apply the criteria, conditions, logic, and/or algorithms to instances of abstract data types and to the operations identified for the instances. Examples of implementation-selection heuristics that can be applied by a compiler are described hereafter.

In general, a default implementation is selected for an instance of an abstract data type unless implementation-selection heuristics dictate selection of another implementation. In addition, source code may or may not explicitly specify an implementation for an instance. If not, then the specified implementation is not overridden, in which case the implementation-selection heuristics are not applied or are otherwise ignored.

At 330, the body of source code is compiled using the selected implementation. Using a selected implementation includes generating the code for the implementation; such code may invoke or be extracted from a library of implementations.

Map Example

The abstract data type MAP is useful for illustrating application of automated ADT implementation. For a given instance of MAP in a body of source, compiler 104 identifies operations removing a key and applies the following implementation-selection heuristic M1.

M1. If all the operations that remove a key are for a key that is the result of a GetMinValue( ) operation, then a min-heap priority map implementation is selected.

A min-heap priority implementation uses a data structure referred to herein as a heap. A heap is a specialized tree-based data structure that satisfies the following heap property: The key of a child node is ordered with respect to the key of the parent node with the same ordering applying throughout the heap. Thus, either:

(1) The keys of parent nodes are less than or equal to those of the respective child nodes and the lowest key is in the root node. A heap with this property is referred to as having a min-heap property. A min-heap priority implementation uses a heap with the min-heap property.

(2) The keys of parent nodes are always greater than or equal to those of the respective child nodes and the highest key is in the root node. A heap with this property is referred to as having a max-heap property. A max-heap priority implementation uses a heap with the max-heap property.

When all the operations that remove a key from an instance are for a key that is the result of the GetMinValue( ) operation, any key removed is the minimal valued key. Under this scenario, min-heap priority implementation offers better performance characteristics than a more generally applicable implementation, such as an implementation based on a hash table. A min-heap priority implementation finds the key with the minimum value in O(1). A hash table based implementation finds the key with the minimum value in O($n$), where n is the number of values stored.

Similarly, another implementation-selection heuristic that is applied for MAP instance is implementation-selection heuristics M2:

M2. If all the operations that remove a key are for a key that is the result of the GetMaXValue( ) operation, then a max-heap priority map implementation is selected.

When all the operations remove from an instance a key that is the result of the GetMaxValue( ) operation, any key removed is the maximum valued key. Under this scenario, the max-heap priority implementation offers better performance characteristics than other implementations for MAP.

Example source code that may compiled and optimized according to the implementation-selection heuristics described above for MAP is source code implementing Dijkstra's Shortest Path Algorithm.

Source Code D

```
Map <Node, Double> reachable;//key is node, value is
                            // double
...
   reachable.Set (root, 0);
   While ( reachable.Size ( ) > 0)
   {
     Node next = reachable.GetMinValuedKey ( );
       // find min-distance
     If (next == destination)
       Break; // found the path
     Else {
     reachable.Remove (next); // remove next from
                              // the reachable
   ... // no other removal below this
     }
   }
```

In Source Code D, the compiler identifies operations on instances of reachable of abstract data type MAP. The compiler determines that the only removed key for reachable is the result of operation GetMinValuedKey( ). Applying implementation-selection heuristics M1, the compiler selects the min-heap priority implementation. Note Source Code D does not specify any implementation for reachable.

LIST Example

The abstract data type LIST is also useful for illustrating application of automated ADT implementation. For a given instance of LIST in a body of source code, compiler 104 identifies operations specified by the source code that remove and insert items into an instance of LIST, and then applies the following implementation-selection heuristic L1.

L1. If items are only removed by operation PopBack( ) and only inserted by operation PushBack( ), then select Dynamic Array implementation for the instance.

The Dynamic Array implementation uses a dynamic array to store elements. The size of the dynamic array may change during run-time.

Under the scenario of L1, the instance of LIST is used as a stack, that is, elements of a list are only inserted and removed at the end of the list. In this scenario, a Dynamic Array implementation has at least better memory usage characteristics and may have better performance characteristics than other types of LIST implementations, such as those that use a linked list. For example, an implementation that uses a linked list generates more objects in memory than a dynamic array. In addition, a linked list may be scattered across memory while data in a dynamic array is aligned, thereby allowing quicker access.

Example source code that may be compiled and optimized according to the implementation-selection heuristic described above for LIST is source code implementing Tarjan's Strongly Connected Component Algorithm.

---

Source Code T

---

```
...
NodeList stack; // list of nodes
InDFS (t: G.Nodes From root) // At node t
    // for depth first search
{
    stack.PushBack (t);
...
}
InPost // At the end of DFS for node t
{
    ...
    Node w = stack.PopBack ( );
    While (w != t) {
        ...
        stack.PopBack ( );
    }
} // no other access of stack in the program
```

In Source Code T, the compiler identifies operations that the source code specifies for instances of stack of abstract data type NODELIST. For stack, compiler 104 determines that the source code specifies that any item removed from stack is only removed by operation PopBack( ) and any item inserted is inserted only by operation PushBack( ). Applying implementation-selection heuristics L1, the compiler selects the Dynamic Array implementation.

Implementation with Transformation

Figure 4:
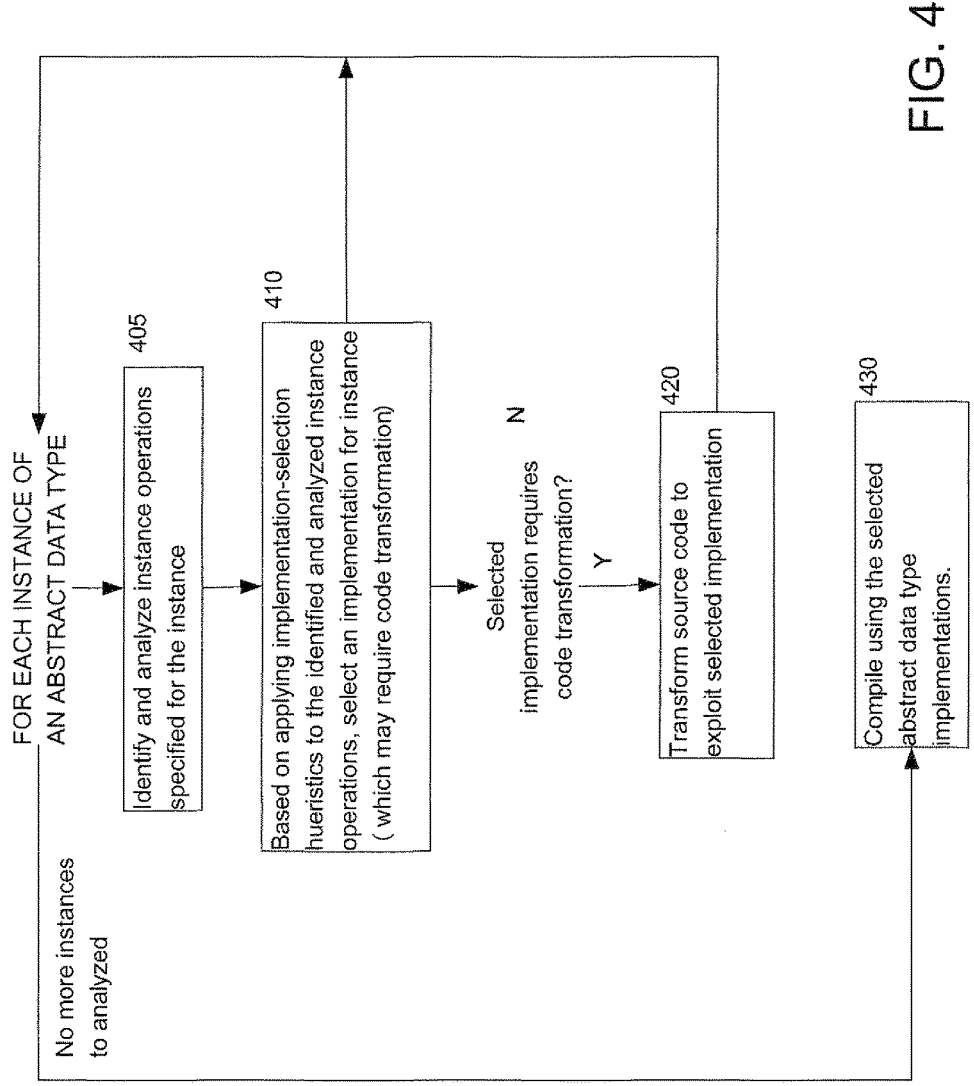
FIG. 4 is a flowchart showing a procedure for automatically selecting an implementation for abstract data types that involves transforming code according to an embodiment of the present invention.

According to an embodiment of the present invention, implementation-selection heuristics may select an implementation that requires a code transformation or rewrite to exploit the implementation. FIG. 4 illustrates a procedure that a compiler may follow to perform automated ADT implementation that transforms code to exploit a particular implementation.

Referring to FIG. 4, for each instance of an abstract data type in a body of source code, at 405, operations performed on the instances are identified and analyzed.

At 410, implementation-selection heuristics are applied to select an implementation, in a manner similar to that described for 310 in FIG. 3. However, application of the implementation-selection heuristics may select an implementation for the instance that requires rewriting source code involving the instance.

At 420, if the selected implementation requires rewriting code, the pertinent code is transformed. An example transformation is described hereafter.

At 430, the body of source code is compiled using the selected implementation and transformed code, in a manner similar to that described for 330 in FIG. 3.

Example Transformation for LIST

Source code implementing Kosaraju's Strongly Connected Component Algorithm is provided to illustrate selection of an implementation involving code transformation. Similar to that described previously, for a given instance of LIST in a body of source code, compiler 104 identifies operations specified by the source code that remove items from and insert items into an instance of LIST, and then applies the following implementation-selection heuristic L2.

L2. If items are only removed by operation PopFront( ) and only inserted by operation PushFront( ), then select Dynamic Array implementation for the instance and transform operations specified for the instance.

---

Source Code K

---

```
NodeList list; // list of nodes
...
For (root: G.Nodes) {
    InDFS (t: G.Nodes From root) { . . . }
    InPost
    { . . .
        list.PushFront (t); // push to the front of the list
    }
}
For (t: list.Items) { // forward iterate over the list
    ...
}
```

In Source Code K, the compiler identifies operations the source code specifies for instance list of abstract data type NODELIST. For list, compiler 104 determines that the source code specifies that items removed from list are only removed by operation PopFront( ) and items inserted into stack are only inserted by operation PushFront( ). Applying implementation-selection heuristic L2, compiler 104 selects to rewrite source code in Source Code K such that the Dynamic Array implementation may be implemented for instance list. To rewrite Source Code K in this way, compiler 104 performs the following code transformations for source code instructions specifying operations on instance list.

1. Replace all the PopFront( ) operations with PopBack( ) operation.
2. Replace all the PushFront( ) operations with PushBack( ).
3. Replace all the Back( ) operations with Front( ).
4. Replace all the Front( ) operations with Back( ).
5. Replace all the forward iteration on the instance (i.e. list) with reverse iteration.
6. Replace all the reverse iteration on the instance (i.e. list) with forward iteration.

Transforming Source Code K according to the above transformations yields the following source code.

```
                    Source Code K'

NodeList list; // list of nodes
    ...
    For (root: G.Nodes) {
       InDFS (t: G.Nodes From root) { ... }
       InPost
       { ...
          list.PushBack (t); // pushFront -> pushBack
       }
    }
    For (t: list.Items inReverse) { // forward ->reverse
       ...
    }
```

After applying the transformations, compiler 104 compiles Source Code K' using the selected Dynamic Array implementation.

In the foregoing specification, examples of implementation-selection heuristics have been described with reference to certain names for operations defined for abstract data types, and with reference to certain names for abstract data types. Specifications for various computer languages may use different names for the same or substantially the same operations and abstract data types. Accordingly, implementation-selection heuristics that may be used in an embodiment are not limited to names used for illustrative the implementation-selection heuristics described herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
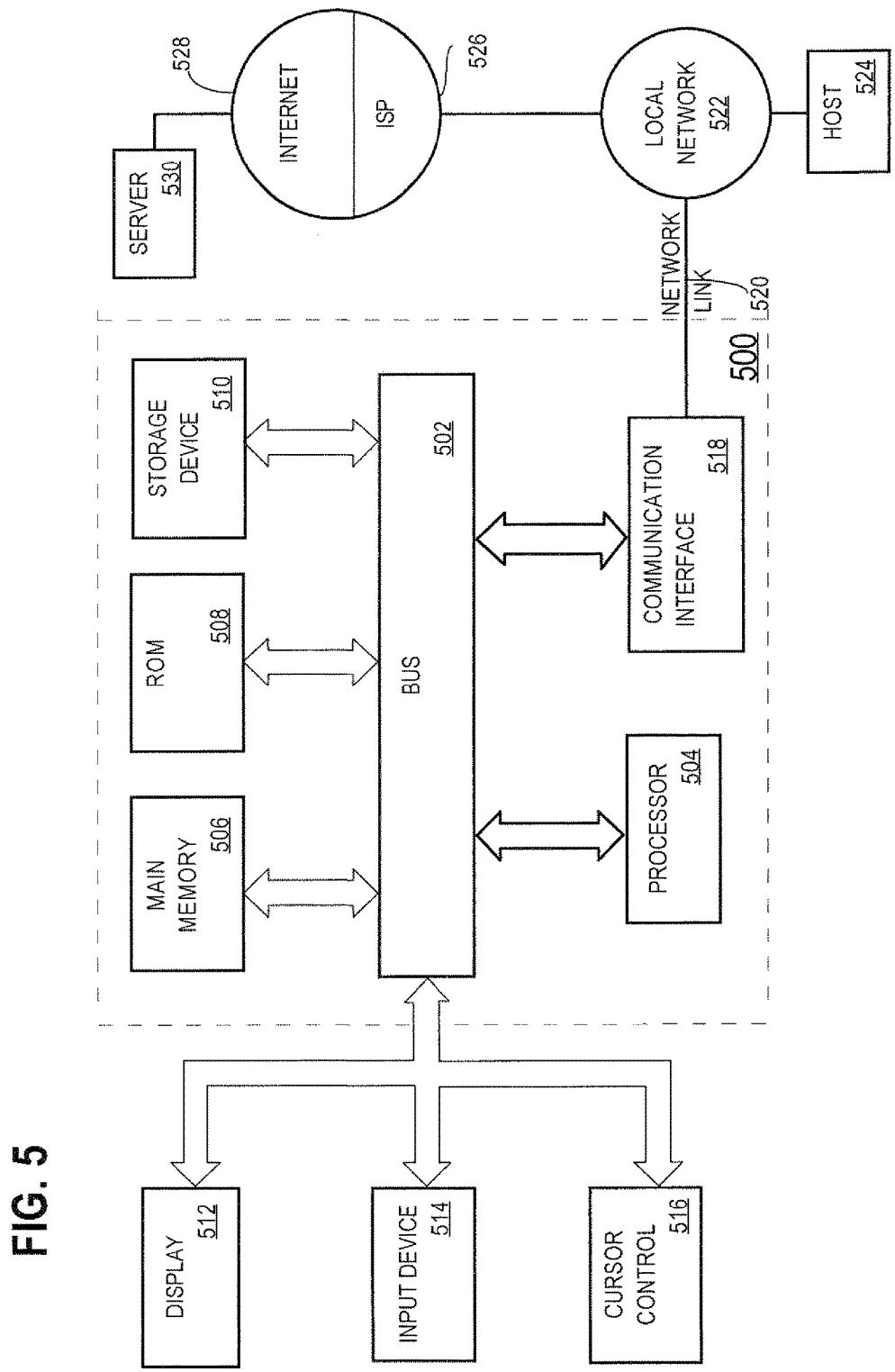
FIG. 5 is a diagram depicting a computer system that may be used to implement an embodiment of the present invention.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

A computer system process comprises an allotment of processor time, and an allotment of memory (physical and/or virtual), the allotment of memory being for storing instructions executed by the processor, for storing data generated by the processor executing the instructions, and/or for storing the processor state (e.g. content of registers) between allotments of the processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising steps of:
identifying, by a compiler, a set of operations that high-level language source code specifies for an instance of an abstract data type;
based on the set of operations, selecting, by the compiler, a certain implementation for said instance; and
in response to selecting said certain implementation, performing by the compiler:
rewriting the high-level language source code specifying operations on said instance to generate rewritten source code, and
compiling the rewritten source code using the certain implementation; and
wherein the method is performed by one or more computing devices.

2. The method of claim 1, wherein said high-level language source code does not specify an implementation for said abstract data type.

3. The method of claim 1, wherein said high-level language source code is written in a computer language that defines the abstract data type as a built-in abstract data type.

4. The method of claim 3, wherein the operations defined for the abstract data type by the computer language include:
an operation to set a value for a key;
an operation to get a value for a key;
an operation to get a key associated with a minimum value; and
an operation to get a key associated with a maximum value.

5. The method of claim 4, wherein selecting a certain implementation for said instance includes in response to determining that the high-level language source code specifies that any operation that removes a key from the instance is for a key that is a result of the operation to get a key associated with a minimum value, selecting a min-heap priority map implementation.

6. The method of claim 4, wherein selecting a certain implementation for said instance includes selecting a max-heap priority map implementation in response to determining that the high-level language source code specifies that any operation that removes a key from the instance is for a key that is a result of said operation to get a key associated with a maximum value.

7. The method of claim 3, wherein the operations defined for the abstract data type by the computer language include:
an operation to insert an item at the end of a list;
an operation to insert an item at the beginning of a list;
an operation to remove and return an item at the end of a list;
an operation to remove and return an item at the beginning of a list;
an operation to return an item at the end of a list; and
an operation to return an item at the beginning of a list.

8. The method of claim 7, wherein selecting a certain implementation for said instance includes selecting a dynamic array implementation in response to determining that the high-level language source code specifies that any operation that removes a key from the instance is said operation to remove a key from the end of a list and that any operation that inserts a key into the instance is said operation to insert a key from the end of a list.

9. The method of claim 7:
wherein selecting a certain implementation for said instance includes selecting a dynamic array implementation in response to determining that the high-level language source code specifies that any operation that removes a key from the instance is said operation to remove a key from the beginning of a list and that any operation that inserts a key from the instance is said operation to insert a key at the beginning of a list;

wherein the method further includes transforming said high-level language source code by performing at least one of the following transformations:
  (a) replace any operation to remove and return an item at the beginning of a list with an operation to remove and return an item at the end of the list;
  (b) replace any operation to insert an item at the beginning of a list with an operation to insert an item at the end of the list,
  (c) replace any operation to return an item at the end of a list with an operation to return an item at the beginning of the list,
  (d) replace any operation to return an item at the beginning of a list with an operation to remove and return an item at the end of the list,
  (e) replace all forward iteration on the instance with reverse iteration, and
  (f) replace all reverse iteration on the instance with forward iteration.

10. One or more non-transitory storage media storing instructions which, when executed by one or more computing devices, cause:
  a compiler to identify a set of operations that high-level language source code specifies for an instance of an abstract data type;
  based on the set of operations, the compiler to select a certain implementation for said instance; and
  in response to selecting said certain implementation, the compiler to:
    rewrite the high-level language source code specifying operations on said instance to generate rewritten source code, and
    compile the rewritten source code using the certain implementation.

11. The one or more non-transitory storage media of claim 10, wherein said high-level language source code does not specify an implementation for said abstract data type.

12. The one or more non-transitory storage media of claim 10, wherein said high-level language source code is written in a computer language that defines the abstract data type as a built-in abstract data type.

13. The one or more non-transitory storage media of claim 12, wherein the operations defined for the abstract data type by the computer language include:
  an operation to set a value for a key;
  an operation to get a value for a key;
  an operation to get a key associated with a minimum value; and
  an operation to get a key associated with a maximum value.

14. The one or more non-transitory storage media of claim 13, wherein selecting a certain implementation for said instance includes in response to determining that the high-level language source code specifies that any operation that removes a key from the instance is for a key that is a result of the operation to get a key associated with a minimum value, selecting a min-heap priority map implementation.

15. The one or more non-transitory storage media of claim 13, wherein selecting a certain implementation for said instance includes selecting a max-heap priority map implementation in response to determining that the high-level language source code specifies that any operation that removes a key from the instance is for a key that is a result of said operation to get a key associated with a maximum value.

16. The one or more non-transitory storage media of claim 12, wherein the operations defined for the abstract data type by the computer language include:
  an operation to insert an item at the end of a list;
  an operation to insert an item at the beginning of a list;
  an operation to remove and return an item at the end of a list;
  an operation to remove and return an item at the beginning of a list;
  an operation to return an item at the end of a list; and
  an operation to return an item at the beginning of a list.

17. The one or more non-transitory storage media of claim 16, wherein selecting a certain implementation for said instance includes selecting a dynamic array implementation in response to determining that the high-level language source code specifies that any operation that removes a key from the instance is said operation to remove a key from the end of a list and that any operation that inserts a key into the instance is said operation to insert a key from the end of a list.

18. The one or more non-transitory storage media of claim 16:
  wherein selecting a certain implementation for said instance includes selecting a dynamic array implementation in response to determining that the high-level language source code specifies that any operation that removes a key from the instance is said operation to remove a key from the beginning of a list and that any operation that inserts a key from the instance is said operation to insert a key at the beginning of a list;
  further including instructions for transforming said high-level language source code by performing at least one of the following transformations:
    (a) replace any operation to remove and return an item at the beginning of a list with an operation to remove and return an item at the end of the list;
    (b) replace any operation to insert an item at the beginning of a list with an operation to insert an item at the end of the list,
    (c) replace any operation to return an item at the end of a list with an operation to return an item at the beginning of the list,
    (d) replace any operation to return an item at the beginning of a list with an operation to remove and return an item at the end of the list,
    (e) replace all forward iteration on the instance with reverse iteration, and
    (f) replace all reverse iteration on the instance with forward iteration.

* * * * *

UNITED STATES PATENT AND TRADEMARK OFFICE
CERTIFICATE OF CORRECTION

PATENT NO. : 10,228,920 B2
APPLICATION NO. : 14/276895
DATED : March 12, 2019
INVENTOR(S) : Sevenich et al.

Page 1 of 1

It is certified that error appears in the above-identified patent and that said Letters Patent is hereby corrected as shown below:

In the Drawings

On sheet 3 of 5, in FIG. 3, under Reference Numeral 310, Line 2, delete "hueristics" and insert -- heuristics --, therefor.

On sheet 4 of 5, in FIG. 4, under Reference Numeral 410, Line 2, delete "hueristics" and insert -- heuristics --, therefor.

On sheet 4 of 5, in FIG. 4, under Reference Numeral 410, Line 4, delete "( which" and insert -- (which --, therefor.

Signed and Sealed this
Twenty-fifth Day of February, 2020

Andrei Iancu
*Director of the United States Patent and Trademark Office*